K. VÖLLER.
VEHICLE WHEEL AXLE.
APPLICATION FILED JULY 7, 1910.
983,186.
Patented Jan. 31, 1911.
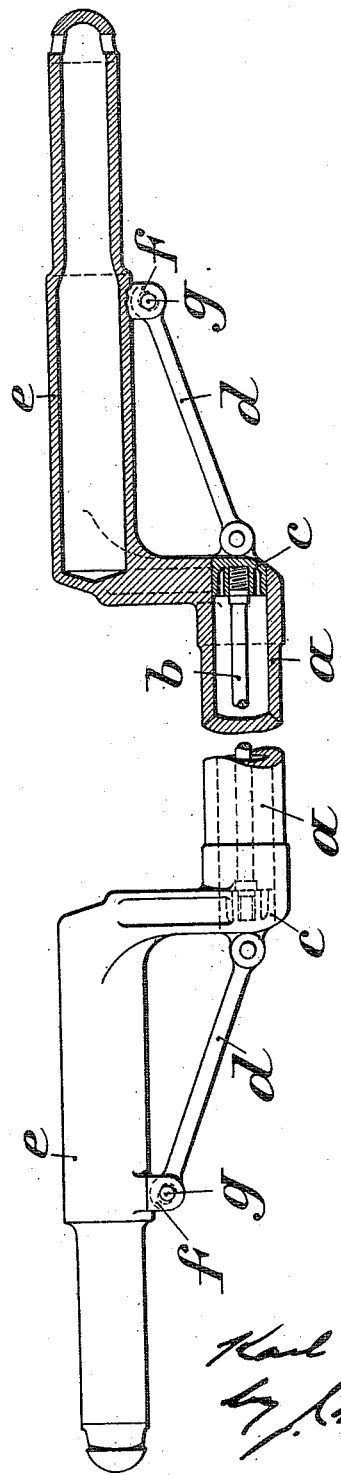

UNITED STATES PATENT OFFICE.

KARL VÖLLER, OF DUSSELDORF, GERMANY, ASSIGNOR TO RHEINISCHE METALL-WAAREN-UND MASCHINENFABRIK, OF DUSSELDORF-DERENDORF, GERMANY.

VEHICLE-WHEEL AXLE.

983,186.

Specification of Letters Patent. Patented Jan. 31, 1911.

Application filed July 7, 1910. Serial No. 570,885.

*To all whom it may concern:*

Be it known that I, KARL VÖLLER, engineer, a subject of the German Emperor, residing at 17 Jülicherstrasse, Dusseldorf, Germany, have invented new and useful Improvements in Vehicle-Wheel Axles, of which the following is a specification.

The axles of gun carriages and other artillery or military vehicles which frequently have to travel over obstacles are liable to considerable concussions or like strains. In many cases these concussions are felt on only one of the two wheels mounted on the axle and that end of the axle may be strained to a dangerous extent while the other end is only normally loaded. Thus while the material at one end of the axle may be strained far beyond the elastic limit, that at the other end may not be exposed to a strain anything like so great. In order to avoid such excessive strains stiff struts have been used which increase the strength of the axle after the manner of a lattice girder.

According to the present invention the strength of the axle is increased by transmitting a part of the strain on one end of the axle to the other end, for which purpose there is provided an intermediate movable strut through which strains causing deformations in one end of the axle are distributed so as to produce also a deformation in the other end. The strut is formed of three or more parts connected together by pivots in such a manner that the middle member is capable of shifting in the direction of the axis of the axle. This construction insures a uniform and certain transmission of strains from one end of the axle to the other.

The accompanying drawing illustrates the invention applied to a dropped axle.

The dropped portion $a$ of the axle is hollow and within it is mounted a rod $b$. This rod can shift in the direction of its axis being screwed at each end into a piston $c$ sliding in the bore of the part $a$. To each piston is pivoted a rod $d$ connected at its other end by a bolt $g$ with an eye $f$ on the corresponding end $e$ of the axle. Thus the ends of the axle are connected together by the movable rod, and the whole connection constitutes a strut.

When one end of the axle receives a concussion which principally happens when the vehicle, traveling at high speed, passes over an obstacle, the strut conveys the shock to the other end of the axle and thus distributes the strain. The whole axle being substantially uniformly strained in this manner, is less liable to break.

As shown in the drawing the bolts $g$ have a certain play in the direction in which the tension occurs on the rods $d$. This play is such that the end of the axle which is subjected to concussion can yield to a certain permissible extent before tension is put upon the strut and the other end of the axle is strained. In this manner the construction has the necessary elasticity. Instead of providing this play the rods constituting the strut can be of such dimensions or form that they have to undergo a predetermined elastic change of form before the strain is transmitted from one end of the axle to the other.

I claim as my invention:

1. An axle for vehicle wheels having a strut, such strut comprising a central member movable in a direction paralleling the axis of the axle and having its ends connected to the axle at points near its opposite ends, and a bearing surrounding said movable member.

2. An axle for vehicle wheels having a strut comprising a central member movable in a direction paralleling the axis of the axle and also having end members pivoted to the axle and to said movable member, and a housing for the latter member.

3. An axle having a dropped portion forming a bearing, and a strut consisting of a series of pivoted members, the central member thereof being mounted in said bearing and movable in a direction paralleling the axis of the axle, and the end members connecting said central member to the axle at points near its opposite ends.

4. An axle having a dropped portion forming a bearing paralleling the axis of the axle, a strut-rod movable longitudinally in said bearing, and links connecting said strut-rod to the axle at opposite points thereof.

5. An axle having a dropped portion forming a bearing paralleling the axis of the axle, a strut-rod movable longitudinally in said bearing, links pivoted to said strut-rod, and means for loosely connecting the links to the axle.

6. An axle having a dropped portion forming a bearing, a strut-rod movable longitudinally in said bearing, pistons on said strut-rod fitted in said bearing, and links connecting the opposite ends of said strut-rod to the axle at opposite points thereof.

In testimony whereof I have signed my name to this specification in the presence of two subscribing witnesses.

KARL VÖLLER. [L. S.]

Witnesses:
   CHAS. J. WRIGHT,
   WALTER VONNEGUT.